Patented July 19, 1932

1,867,584

UNITED STATES PATENT OFFICE

CHARLES G. MOORE, OF LAKEWOOD, AND MILTON ZUCKER, OF CLEVELAND, OHIO, ASSIGNORS TO THE GLIDDEN COMPANY, OF CLEVELAND, OHIO, A CORPORATION OF OHIO

SYNTHETIC RESIN AND PROCESS OF MAKING THE SAME

No Drawing. Application filed June 12, 1929. Serial No. 370,454.

Synthetic resins have been known in the art for a number of years. Of these, resins of the polyhydric alcohol-polybasic acid type have been known consequent to the investigations of J. Watson Smith (Journal Soc. Chem. Ind. 1901: 1075). For these, generally phthalic anhydride and glycerol, with a modifying acid, are employed. Of such synthetic resins, the various types offer certain advantages, coupled however with certain disadvantages, and although introduced for usage in liquid coating compositions, drawbacks persist. We have found that phthalic acid-glycerol with modifying acid resins are not satisfactory for spirit varnishes, not having such toughness and elasticity as is desirable, and not being sufficiently waterproof. If high molecular weight acids, such as the acids of the fatty oils, be employed as the modifying acid, the same difficulties persist. If tung oil acids be employed, the lack of water resistance is overcome to some extent, but not a sufficiently large percentage can be incorporated, since it is found that the tung oil acids tend to produce an insoluble gel on heating. In accordance with our present invention however, a highly flexible waterproof resin can be prepared by a suitable modification of the polyhydric alcohol-polybasic acid resins.

In its general aspects, the invention contemplates preparing a synthetic resin with polyhydric alcohol-polybasic acid constituents together with constituents providing a phenolic compound and a compound such as an aldehyde or a ketone. The amounts of the latter two constituents may be quite considerable, but ordinarily it is desirable to maintain their combined percentage less than 50 per cent. by weight of the total mixture, in order to insure clear products which if used in a spirit varnish will give a clear and glossy film.

For the preparation of products in accordance with the present invention, a polyhydric alcohol, as glycerol, polyglycerol, glycol and the like, together with a polybasic acid, for instance phthalic anhydride, are brought into reaction along with a modifying monobasic acid, particularly an aliphatic or fatty acid, such as an unsaturated fatty acid of the character derived from drying oils, and along with the foregoing constituents there are also provided a phenol, and an aldehyde or a ketone.

As an example of the practice of our invention, we take cresylic acid (i. e., a mixture of cresols, with which there may also be phenols) 7.7 parts, paraldehyde 2.3 parts, phthalic anhydride 45 parts, glycerol 22 parts, and linseed oil acids 23 parts. The reaction mixture is heated at a temperature of about 250° C., preferably in an inert atmosphere, until a test sample shows the desired degree of toughness. As aldehyde is lost through volatilization, the excess phenol condenses with the glycerol. The reaction is sufficiently slow to give a very exact check on the results, as the resin does not have a great tendency to gel abruptly after reaching the desired stage. The resin product is readily soluble in low boiling solvents, and advantageous for lacquer mixing.

By employing various fatty acids, the results may be slightly modified in desired directions, and similarly with the phenol, and aldehyde or ketone, some latitude of variation may be had depending upon the particular phenol or aldehyde or ketone employed. And thus within the scope of the invention, products may be prepared which afford in high degree characteristics adaptable to commercial varnish usage, for tough elastic and waterproof films, and with such further qualities as to miscibility in lacquers, etc., as may be desired.

Other modes of applying the principle of the invention may be employed, change being made as regards the details described, provided the steps or constituents stated in any of the following claims, or the equivalent of such, be employed.

We therefore particularly point out and distinctly claim as our invention:—

1. A composition, consisting of the reaction product of a polyhydric-alcohol, an organic polybasic acid, an unsaturated fatty-acid, a phenol, and a compound selected from the group consisting of aldehydes and ketones.

2. A composition, consisting of the reaction product of a polyhydric alcohol, an organic polybasic acid, a drying oil fatty acid, a phenol and a compound selected from the group consisting of aldehydes and ketones.

3. A composition, consisting of the reaction product of a polyhydric alcohol, an organic polybasic acid, linseed oil acids, a phenol and a compound selected from the group consisting of aldehydes and ketones.

4. A composition, consisting of the reaction product of a polyhydric-alcohol, an organic polybasic-acid, an unsaturated fatty-acid, cresylic acid, and paraldehyde.

5. A composition, consisting of the reaction product of a polyhydric alcohol, an organic polybasic acid, a drying oil fatty acid, cresylic acid and paraldehyde.

6. A composition, consisting of the reaction product of a polyhydric alcohol, an organic polybasic acid, linseed oil acids, cresylic acid and paraldehyde.

7. A process of the character described, which comprises reacting between a polyhydric-alcohol, an organic polybasic acid, an unsaturated fatty acid, a phenol, and a compound selected from the group consisting of aldehydes and ketones.

8. A process of the character described, which comprises reacting between a polyhydric alcohol, an organic polybasic acid, a drying oil fatty acid, a phenol and a compound selected from the group consisting of aldehydes and ketones.

9. A process of the character described, which comprises reacting between a polyhydric alcohol, an organic polybasic acid, linseed oil acids, a phenol and a compound selected from the group consisting of aldehydes and ketones.

10. A process of the character described, which comprises reacting between a polyhydric-alcohol, an organic polybasic acid, an unsaturated fatty acid, cresylic acid, and paraldehyde.

11. A process of the character described, which comprises reacting between a polyhydric alcohol, an organic polybasic acid, a drying oil fatty acid, cresylic acid and paraldehyde.

12. A process of the character described, which comprises reacting between a polyhydric alcohol, an organic polybasic acid, linseed oil acids, cresylic acid and paraldehyde.

Signed by us this 7 day of June, 1929.

CHARLES G. MOORE.
MILTON ZUCKER.